(No Model.)
W. C. BARR.
PORTABLE HOISTING APPARATUS.
No. 458,993. Patented Sept. 8, 1891.
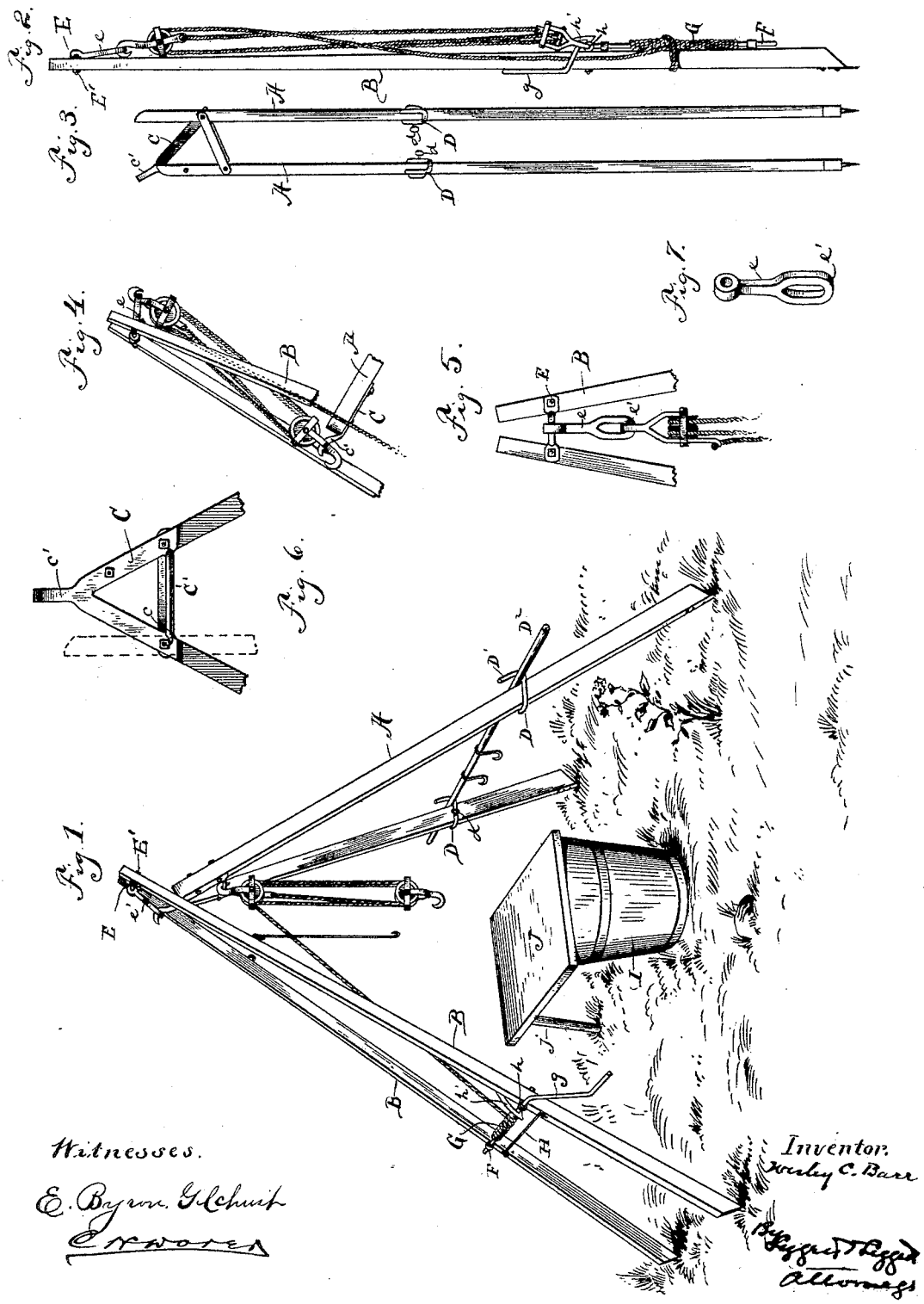

UNITED STATES PATENT OFFICE.

WESLEY C. BARR, OF BLOOMFIELD, OHIO.

PORTABLE HOISTING APPARATUS.

SPECIFICATION forming part of Letters Patent No. 458,993, dated September 8, 1891.

Application filed January 23, 1891. Serial No. 378,784. (No model.)

*To all whom it may concern:*

Be it known that I, WESLEY C. BARR, of Bloomfield, in the county of Morrow and State of Ohio, have invented certain new and useful Improvements in Portable Hoisting Apparatus; and I do hereby declare the following to be a full, clear, and exact description of the invention, such as will enable others skilled in the art to which it pertains to make and use the same.

My invention relates to improvements in portable hoisting apparatus, the object being to adapt the device not only for hoisting ordinary loads, but especially to adapt the apparatus for handling hogs and beeves and dressing the same, provision also being made for hanging the dressed meat on attachments of the apparatus.

With these objects in view my invention consists in certain features of construction and in combination of parts, hereinafter described, and pointed out in the claims.

In the accompanying drawings, Figure 1 is a view in perspective. Figs. 2 and 3 are elevations showing the two shears detached and folded or in knockdown condition for transportation. Fig. 4 is a view in perspective in detail. Figs. 5 and 6 are elevations in detail. Fig. 7 is a view in perspective in detail of link $e$.

My improved hoisting apparatus comprises in the main two collapsible shears A and B, the latter being the longer and the former, having directly to support the load, being usually constructed the stronger of the two shears. The legs of the shears are usually constructed of scantling and metal-pointed at their lower ends to prevent slipping. The shears, of course, may be constructed lighter or heavier, according to the work to be done; but for most purposes the shears may be so light that they are easily handled and carried about from place to place. The legs of shears A are connected at the top by means of a triangular yoke C, the one leg of the yoke being bolted fast to the one leg of the shears, as shown on the right hand in Fig. 6, the other leg of the yoke being pivotally secured to the other leg of the shears by means of a single securing-bolt, as at $c$, thus constituting a hinge for this leg that accordingly may be turned on bolt $c$ as an axis. (See dotted lines, Fig. 6.) Hence shears A may be collapsed for transportation, and when in use the legs of the shears may be distended more or less, according to circumstances. The lower member or cross-bar $C'$ of the yoke is convenient for attaching the tackle-block hook, and to this end at least the central section of member $C'$ should be rounded to receive the hook of the tackle-block. The yoke terminates above in a hook $c'$ for purposes hereinafter mentioned. The legs of shears A are provided with metal loops or bands D, adapted to fit the legs loosely, so that these loops may be moved up or down the legs, as required, these loops terminating in large hooks $D'$ for receiving a cross-bar or pole $D^2$ on which to hang the dressed meat. When a load is suspended from the pole or cross-bar, the loops are thereby cramped on the legs of the shears, and thus maintain their position by friction; but to hold the loops D at the desired elevation when not loaded the loops are provided with thumb-screws, as at $d$, the ends of these screws when tightened engaging the opposing leg of the shears. The upper end of the legs of shears B are connected by means of two cross-bars E E', placed opposite each other and bolted through and through with a single bolt at each end of the cross-bars. Hence these cross-bars and securing-bolts serve as hinges for the legs, so that the legs may be collapsed or spread apart, as desired. On cross-bar E is mounted a link $e$, that may serve as a means of coupling the two shears, the link having an eye adapted to receive the cross-bar loosely, and the other end of the link having a large loop $e'$.

In Figs. 2 and 5 the link is shown depending from cross-bar E, and in Fig. 1 the link is shown engaging hook $c'$ for coupling the two shears together. In Fig. 4 the link is shown reversed or turned over the top of cross-bar E'.

F F are eyebolts, the eyes whereof serve as journal-boxes for the axle of windlass G. The crank $g$ of the windlass may be removable or may be jointed, so as to fold to be packed in small compass, if so desired.

H is a tie-rod, having a hook end at one end and an eye at the other end for respectively engaging staples driven into the respective legs of the shears. When the tie-rod is hooked, the legs of the shears are held at the proper distance apart to accommodate the windlass.

When the tie-rod is unhooked, the legs may be spread apart to disengage the tail end of the windlass from its eyebolt, after which the windlass may be turned alongside the leg bearing the eyebolt next to the crank, this eyebolt, of course, turning in the hole of the leg in which the bolt is inserted. The windlass should be provided with a ratchet-wheel and pawl, as at $h$ $h'$, to hold the load suspended, when so desired. It will be seen, therefore, that the entire apparatus in its knocked-down condition can be folded and packed in small compass for transportation.

In Fig. 1 the apparatus is shown in position for dressing, for instance, hogs, I representing the scalding tub or vat and J the dressing-table, the latter having two legs $j$ $j$ at the tail end, the forward end of the table being adapted to rest on the scalding-tub. During the scalding operation the table is tilted back out of the way, and after the hog has been scalded and elevated a sufficient distance above the tub the table is returned to the position shown. After the dressing the carcass is again suspended by means of the tackle and pawl and is swung to one side and suspended from pole $D^2$. For light loads the rope of the tackle and pawl may be operated by hand, but for heavy loads the rope is wound upon the windlass.

In Fig. 4 is shown a position of parts that may be used to advantage in lifting or upending heavy loads, or where it is desired to use shears A for an incline.

What I claim is—

1. A portable hoisting apparatus comprising two shears, the legs of each shears being pivotally connected for folding or distending, a hook connected with the one shears, and a link connected with the other shears, the hook and link being adapted to mutually engage each other in connecting the two shears at the top end, substantially as set forth.

2. A portable hoisting apparatus comprising two shears, the legs of the one shears being connected by means of a triangular yoke, the yoke being rigidly secured to the one leg and pivotally secured by means of a single bolt to the other leg, such yoke terminating above in a hook, the lateral member or cross-bar of the yoke being adapted to engage a hook of a tackle-block, substantially as set forth.

3. A portable hoisting apparatus comprising two collapsible and distensible shears, the legs of the one shears being pivotally connected by means of cross-bars set opposite each other and secured by a single bolt at each end of the cross-bar, the one cross-bar bearing a reversible link or coupling, substantially as set forth.

4. A portable hoisting apparatus comprising two collapsible shears and means, substantially as indicated, for connecting the shears, the one shears having a windlass mounted on eyebolts and adapted to be folded alongside the one leg of the shears, the legs of the other shears being embraced by loops terminating in hooks and adjustable up and down the legs for sustaining at any desired elevation a cross-bar, pole, or other lateral device, substantially as set forth.

In testimony whereof I sign this specification, in the presence of two witnesses, this 20th day of December, 1890.

WESLEY C. BARR.

Witnesses:
C. G. SEARTS,
H. W. BUTLER.